(12) United States Patent
Cooke et al.

(10) Patent No.: US 9,253,258 B2
(45) Date of Patent: Feb. 2, 2016

(54) DYNAMIC HOST INTEGRATION

(71) Applicants: Robert Raymond Cooke, Lake Mary, FL (US); Jonathan Daniel Cordero, Orlando, FL (US); Mark Thomas Alston, Orlando, FL (US)

(72) Inventors: Robert Raymond Cooke, Lake Mary, FL (US); Jonathan Daniel Cordero, Orlando, FL (US); Mark Thomas Alston, Orlando, FL (US)

(73) Assignee: NCR CORPORATION, Duluth, GA (US)

( * ) Notice: Subject to any disclaimer, the term of this patent is extended or adjusted under 35 U.S.C. 154(b) by 413 days.

(21) Appl. No.: 13/836,876

(22) Filed: Mar. 15, 2013

(65) Prior Publication Data

US 2014/0281025 A1    Sep. 18, 2014

(51) Int. Cl.
*H04L 29/08* (2006.01)
(52) U.S. Cl.
CPC ...................................... *H04L 67/12* (2013.01)

(58) Field of Classification Search
CPC ................................ H04L 67/12; H04L 29/08
See application file for complete search history.

(56) References Cited

U.S. PATENT DOCUMENTS

2002/0138660 A1\* 9/2002 Eilers et al. .................... 709/313
2012/0036348 A1\* 2/2012 Grodsky et al. ............... 713/150

\* cited by examiner

*Primary Examiner* — Ebrahim Golabbakhsh
(74) *Attorney, Agent, or Firm* — Schwegman, Lundberg, Woessner

(57) ABSTRACT

Dynamic host integration techniques are provided. A Transaction-based system integrates heterogeneous hosts to perform various operations associated with the transaction-based system. A command handler implements a specific operation for a host system and a protocol handler implements a specific communication protocol for contacting and having the host system execute the specific operation. For any given transaction within the transaction-based system a command handler and a protocol handler are dynamically acquired and bound to the processing flow to execute a desired operation on a remote and heterogeneous host system.

9 Claims, 3 Drawing Sheets

DYNAMIC HOST INTEGRATION

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

Even websites and stores online may be viewed as a form of a kiosk. A tremendous amount of services are now available online via website portals. Business even attempt to tie their backend systems to existing website services offered by third parties.

By and Large, Large scale Self Service Device (SSD) systems (and websites/applications) must communicate with a heterogeneous mixture of reservation and service providers via numerous disparate and independent interfaces. Many of these interfaces provide similar functionality but must be used in conjunction with custom business rules to provide a complete solution. These interfaces, in combination with custom software, generally use a combination of web services, file transfers, databases, messages, or screen-scraping processes as ad-hoc gateways to communicate with vendor systems.

Even though multiple customers may be using services from a same host, it can be difficult to maintain a common host integration codebase due to the presence of customer-specific logic. Additionally, it is difficult for a customer to transition from one host to another host when the customer-specific business logic is strongly tied to the integration code.

Moreover, travel solutions are typically built over a large variety of services that are provided by third-party host systems. These host systems uses a wide variety of different technologies for providing communication. This makes it extremely challenging to provide a clean and maintainable interface for implementing connectivity to a variety of services within a single solution.

SUMMARY

In various embodiments, techniques for providing host integration to transaction processing systems are presented. According to an embodiment, a method for providing host integration is provided.

Specifically,

DETAILED DESCRIPTION

Figure 1:
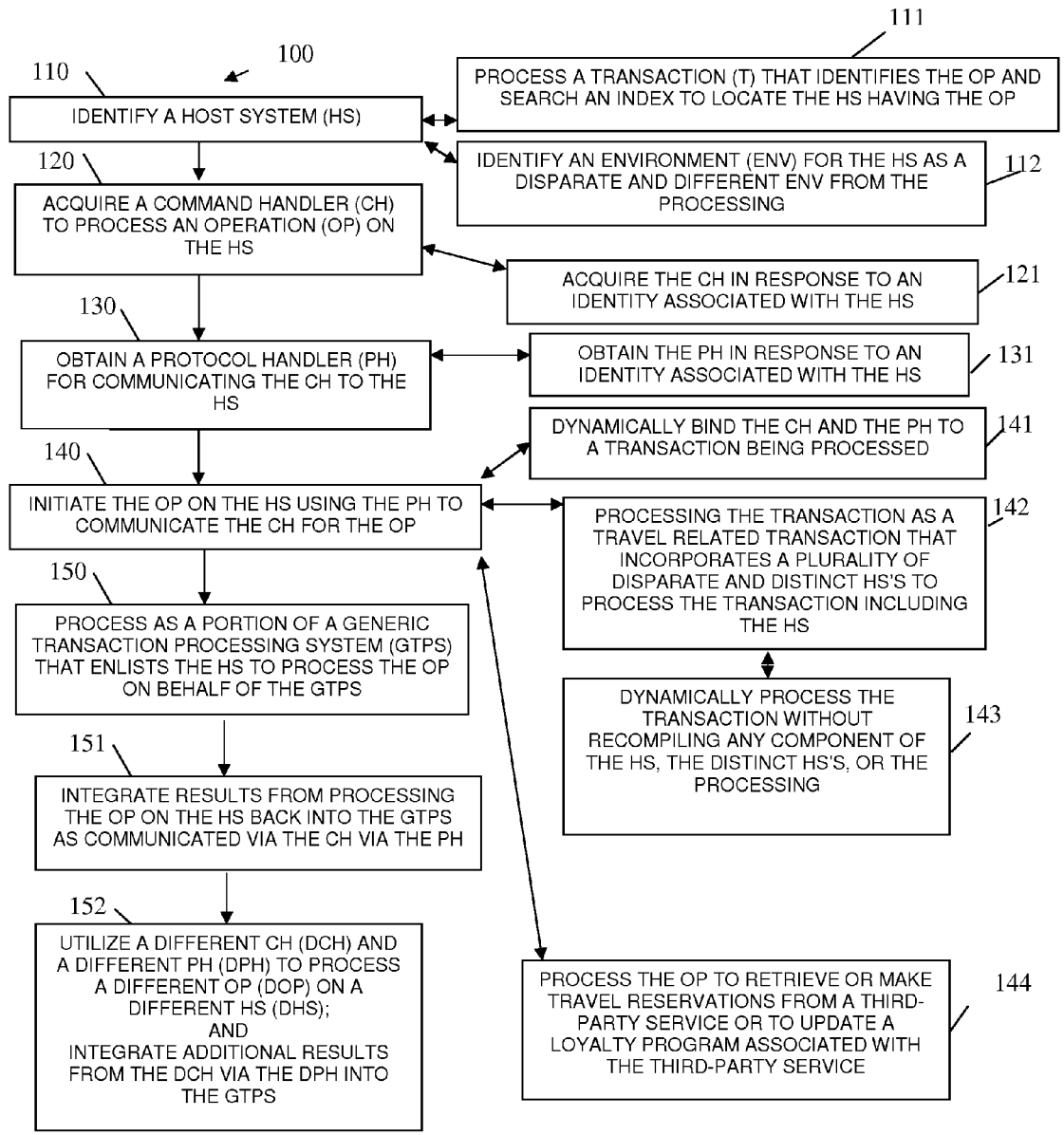
FIG. 1 is a diagram of a method for providing host integration to a transaction processing system, according to an example embodiment.

FIG. 1 is a diagram of a method 100 for providing host integration to a transaction processing system, according to an example embodiment. The method 100 (hereinafter "heterogeneous host controller") is implemented as instructions programmed and residing within memory and/or on a non-transitory computer-readable (processor-readable) storage medium and executed by one or more processors of: a server, web-based Internet portal, cloud, virtual machine (VM), etc. over a network connection. The processors are specifically configured and programmed to process the heterogeneous host controller. The heterogeneous host controller also operates over a network. The network is wired, wireless, or a combination of wired and wireless.

Initially, some context and examples for the various embodiments presented herein are presented for purposes of illustration and comprehension.

The techniques herein for dynamic host integration abstract away the number and types of airline transaction providers and easily changes the configuration dynamically based on custom rules and events.

The techniques provide a framework to implement host system abstractions for heterogeneous host environments using strategy patterns and inversion of control (IoC—dynamic module binding and resolution at runtime for components of interfaces).

In order to support a variety of external host systems, the overall system provides a framework for creating, loading, and resolving interoperability components.

Each interoperability component implements a strategy pattern for executing one particular domain technique using interactions that are specific to the host system that implements portions of that domain model.

Individual interoperability components can draw from multiple host systems to implement a single domain operation.

Interoperability components are selected and loaded using an inversion of control mechanism (dynamic binding mechanism).

This allows new interoperability components to be designed and loaded without ever having to modify or recompile the framework.

Additionally, the framework provides a mechanism for locating interoperability components that are available to the system (generic transaction processing system for host integration).

The techniques herein employ a strategy pattern to dynamically load pluggable components capable of supporting particular Third-party services. Common interfaces are normalized allowing for a unified view over what may be a variety of heterogeneous services. Because the implementation components are fully encapsulated many of the concerns with supporting particular systems do not bleed into the overall integration framework.

The techniques use two components:

1. Command Handlers are used to implement specific operations (such as retrieving a reservation or updating a loyalty program); and 2. Protocol Handlers are used to implement a specific communication protocol (Simple Object Access Protocol (SOAP), REpresentational State Transfer (REST), screen scraping, etc.).

Handlers are created as part of the integration effort with a particular system (host site), but may be reusable across projects depending on needs (e.g. a particular airline customer may override some operations for a reservation system, but the non-overridden operations may be reused across different customer solutions—or even concurrently in multi-tenant applications).

It is within this context that the processing associated with the heterogeneous host controller is now presented with reference to the FIG. 1.

At 110, the heterogeneous host controller identifies a host system. A host system is a remote network service and environment associated with a transaction or a piece of a transaction, such as but not limited to an airline reservation system, a travel portal, a rental car web site, and the like.

According to an embodiment, at 111, the heterogeneous host controller processes a transaction that identifies the operation and searches an index to locate the host system having the operation. That is, the transaction can include a plurality of operations for a transaction. Each transaction can be used to search for a third-party host system that can handle the operation on behalf of the heterogeneous host controller.

In an embodiment, at 112, the heterogeneous host controller identifies an environment for the host system as a disparate and different environment from an environment that processes the heterogeneous host controller.

At 120, the heterogeneous host controller acquires a command handler to process an operation on the host system on behalf of the heterogeneous host controller. Some example information associated with the command handler was presented above.

In an embodiment, at 121, the heterogeneous host controller acquires the command handler in response to an identity associated with the host system. That is, the command handler is customized for the host system.

At 130, the heterogeneous host controller obtains a protocol handler for communicating the command handler to the host system.

According to an embodiment, at 131, the heterogeneous host controller obtains the protocol handler in response to an identity associated with the host system.

At 140, the heterogeneous host controller initiates the operation on the host system using the protocol handler to communicate the command handler for the operation.

In an embodiment, at 141, the heterogeneous host controller dynamically binds the command handler and the protocol handler to a transaction being processed.

Continuing with the embodiment of 141 and at 142, the heterogeneous host controller processes the transaction as a travel related transaction that incorporates a plurality of disparate and distinct host systems to process the transaction including the host system.

Still continuing with the embodiment of 142 and 143, the heterogeneous host controller dynamically processes the transaction without recompiling any component of the host system, the distinct host systems, or the heterogeneous host controller.

In an embodiment, at 144, the heterogeneous host controller processes the operation to retrieve or make travel reservations from a third-party service or to update a loyalty program associated with the third-party service.

According to an embodiment, at 150, the heterogeneous host controller processes a portion of a generic transaction processing system that enlists the host system to process the operation on behalf of the generic transaction processing system.

Continuing with the embodiment of 150 and at 151, the heterogeneous host controller integrates results from the processing of the operation on the host system back into the generic transaction processing system as communicated via the command handler via the protocol handler.

Still continuing with the embodiment of 151 and at 152, the heterogeneous host controller utilizes a different command handler and a different protocol handler to process a different operation on a different host system. The heterogeneous host controller also integrates additional results from the different command handler via the different protocol handler into the generic transaction processing system.

Figure 2:
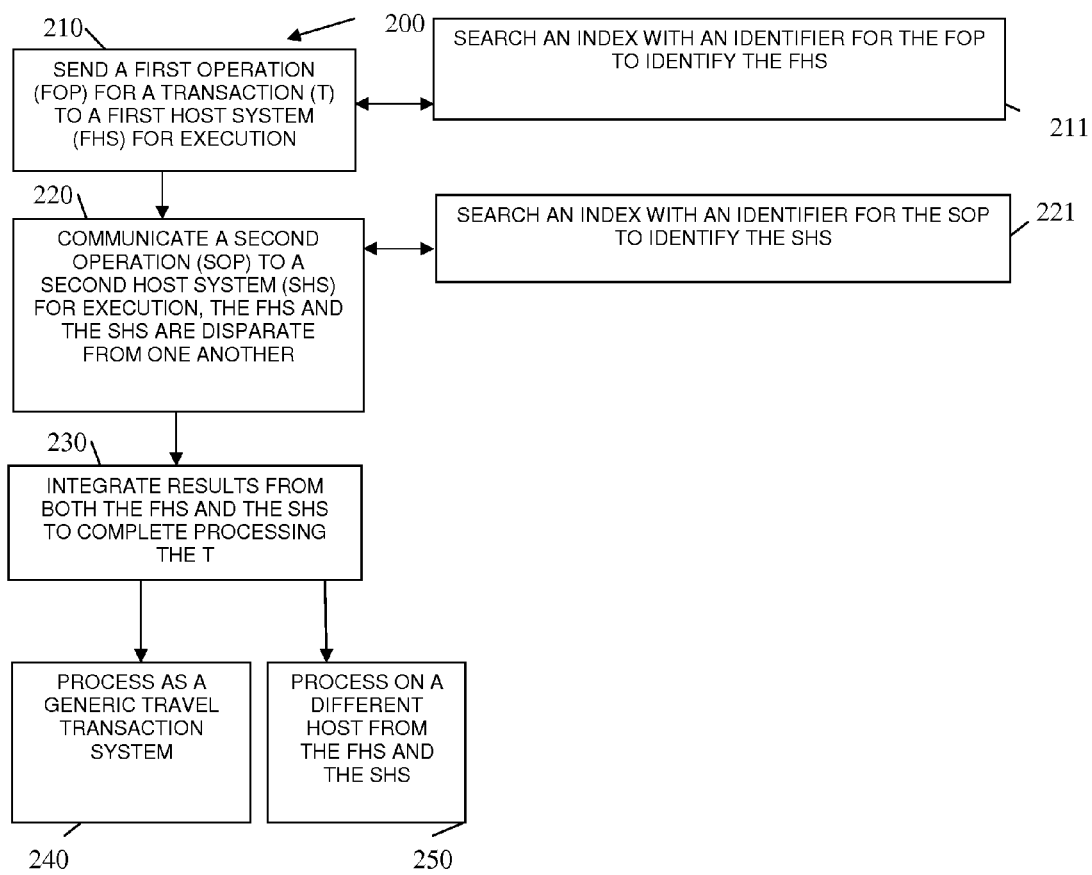
FIG. 2 is a diagram of another method for providing host integration to a transaction processing system, according to an example embodiment.

FIG. 2 is a diagram of another method 200 for providing host integration to a transaction processing system, according to an example embodiment. The method 200 (hereinafter "host integrator") is implemented as executable instructions and programmed within memory and/or on a non-transitory computer-readable (processor-readable) storage medium that executes on one or more processors of a network-based machine or stand-alone machine; the processors of the machine are specifically configured to execute the host integrator. The host integrator is also operational over a network; the network is wired, wireless, or a combination of wired and wireless.

The processing of the host integrator reflects enhanced and different aspects of the heterogeneous host controller represented by the method 100 of the FIG. 1.

At 210, the host integrator sends a first operation for a transaction to a first host system for execution.

In an embodiment, at 211, the host integrator searches an index with an identifier for the first operation to identify the first host system.

At 220, the host integrator communicates a second operation to a second host system. The first host system and the second host systems are disparate from one another.

According to an embodiment, at 221, the host integrator searches an index with an identifier for the second operation to identify the second host system.

At 230, the host integrator integrates the results from both the first host system and the second host system to complete the processing of the transaction.

According to an embodiment, at 240, the host integrator processes as a generic travel transaction system.

In yet another case, at 250, the host integrator processes on a different host from the first host system and the second host system.

The operations are communicated to their respective host systems via command handlers and via specific protocol handlers specific to their host systems. This was described above with reference to the FIG. 1.

Figure 3:
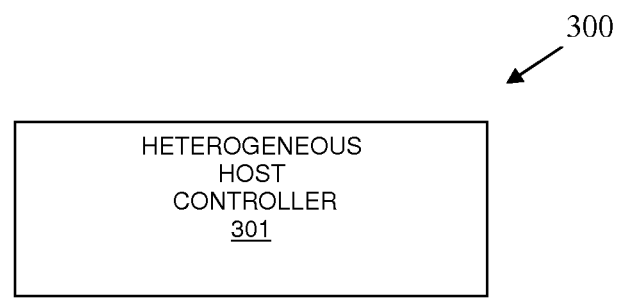
FIG. 3 is a diagram of a host integration system, according to an example embodiment.

FIG. 3 is a diagram of a host integration system 300, according to an example embodiment. The components of the host integration system 300 are implemented as executable instructions and programmed within memory and/or on a non-transitory computer-readable (processor-readable) storage medium that execute on one or more processors of a network-based server (cloud, proxy, Virtual Machine (VM), etc.) or a standalone machine (client device (laptop, tablet, computer), cashier-manned checkout station, self-service checkout station, kiosk, etc.); the processors are specifically configured to execute the components of the host integration system 300. The host integration system 300 is also operational over a network; the network is wired, wireless, or a combination of wired and wireless.

The host integration system 300 includes a heterogeneous host controller 301.

The host integration system 300 includes a one or more network-based or standalone machine processors accessible, which can be accessible over a network connection. The one or more processors include execution instructions for the heterogeneous host controller 301, which resides and is programmed within memory and/or on a non-transitory computer-readable storage medium and processed on the one or more processors. Example processing associated with the heterogeneous host controller 301 was presented in detail above with reference to the FIGS. 1 and 2, respectively.

The heterogeneous host controller 301 is configured to identify host systems to process operations associated with a transaction of a generic transaction processing system. The heterogeneous host controller 301 is also configured to interact with those host systems to have those host systems process the operation. Finally, the heterogeneous host controller 301 is configured to integrate results returned from the host systems into the transaction.

According to an embodiment, the heterogeneous host controller 301 is configured to dynamically bind component modules into the transaction at run time to interact with the host systems.

In an embodiment, the heterogeneous host controller 301 is configured to locate component modules for each of the host systems based on the operations defined in the transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a machine configured to execute the method, comprising:
   identifying, at the machine, a host system;
   acquiring, via the machine, a command handler to process an operation on the host system;
   obtaining, via the machine, a protocol handler for communicating the command handler to the host system;
   initiating, via the machine, the operation on the host system using the protocol handler to communicate the command handler for the operation, wherein initiating further includes dynamically binding the command handler and the protocol handler to a transaction being processed by the method; and
   processing, via the machine, the transaction as a travel related transaction that incorporates a plurality of disparate and distinct host systems to process the transaction including the host system, wherein processing further includes dynamically processing the transaction without recompiling any component of the host system, the distinct host systems, or the method.

2. The method of claim 1 further comprising, processing the method as a portion of a generic transaction processing system that enlists the host system to process the operation on behalf of the generic transaction processing system.

3. The method of claim 2 further comprising, integrating results from processing the operation on the host system back into the generic transaction processing system as communicated via the command handler via the protocol handler.

4. The method of claim 3 further comprising:
   utilizing, by the machine, a different command handler and a different protocol handler to process a different operation on a different host system; and
   integrating, via the machine, additional results returned from the different command handler via the different protocol handler into the generic transaction processing system.

5. The method of claim 1, wherein identifying further includes processing a transaction that identifies the operation and searching an index to locate the host system having the operation.

6. The method of claim 1, wherein identifying further includes identifying an environment for the host system as a different environment from that which is associated with the method.

7. The method of claim 1, wherein acquiring further includes acquiring the command handler in response to an identity associated with the host system.

8. The method of claim 1, wherein obtaining the protocol handler in response to an identity associated with the host system.

9. The method of claim 1, wherein initiating further includes processing the operation to retrieve or make a travel reservation from a third-party service or to update a loyalty program associated with the third-party service.

* * * * *